W. W. KARRO.
MAT.
APPLICATION FILED JAN. 9, 1920.

1,361,069.

Patented Dec. 7, 1920.

William W. Karro
INVENTOR.

BY

Victor J. Evans
ATTORNEY.

UNITED STATES PATENT OFFICE.

WILLIAM W. KARRO, OF GREAT NECK, NEW YORK.

MAT.

1,361,069. Specification of Letters Patent. Patented Dec. 7, 1920.

Application filed January 9, 1920. Serial No. 350,415.

*To all whom it may concern:*

Be it known that I, WILLIAM W. KARRO, residing at Great Neck, in the county of Nassau and State of New York, have invented new and useful Improvements in Mats, of which the following is a specification.

This invention relates to mats, and comprehends a novel construction, primarily designed for use in connection with chicken coops or the like, and by means of which straw or the like is scraped from the chickens' feet as they leave the poultry house with a view of preventing straw from being carried into the yard.

The nature and advantages of the invention will be better understood when the following detail description is taken in connection with the accompanying drawings, the invention residing in the construction, combination and arrangement of parts as claimed.

In the drawings forming part of this specification, like numerals of reference indicate similar parts in the several views and wherein.

Figure 1:
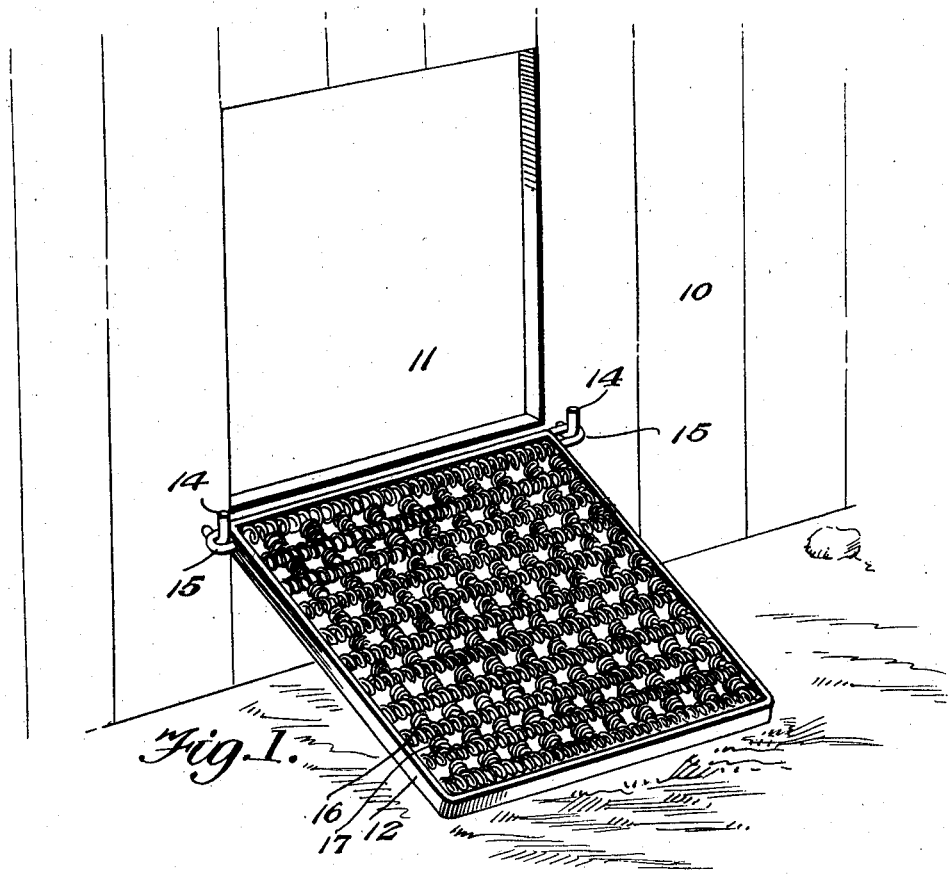
Figure 1 is a perspective view showing the mat associated with the chicken coop.
Figure 2:
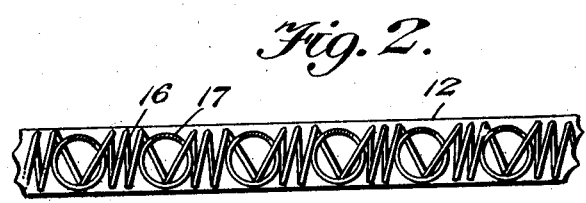
Fig. 2 is a sectional view through the mat.

Referring to the drawing in detail, 10 indicates the chicken coop or the like provided with a door opening or entrance 11. The mat forming the subject matter of my invention is primarily intended for use in connection with a chicken coop or the like, and as shown in Fig. 1, the mat is disposed with reference to the entrance 11 so that it will scrape or remove the straw from the chickens' feet as they leave the coop, in order that the straw will not be carried into the yard. The mat according to the preferred embodiment of the invention embodies a frame 12 of substantially rectangular formation, although the mat can vary in size and configuration without departing from the spirit of the invention. Projecting from the coop 10 adjacent the lower corners of the door opening 11, are hooks 14 which are received by the eyes 15 carried by the adjacent corners of the mat, so that the mat will be sustained at the proper inclination with regard to the ground. Arranged within the confines of the frame are closely associated longitudinal rows of coiled springs 16, with which are associated a plurality of closely associated transverse rows of similar springs 17. The convolutions of the springs are so disposed as to scrape or remove the straw from the chickens' feet as the chickens walk over the mat upon leaving the coop 10. The construction is such, that it may provide a soft footing for the chickens and will in no way injure the feet of the latter.

While I have shown and described what I consider the preferred embodiment of the invention, I desire to have it understood that I do not limit myself to the exact construction and arrangement of parts disclosed, and that such changes may be resorted to when desired as fall within the scope of what is claimed.

Having thus described my invention what I claim as new is:—

The combination with a chicken coop or the like having a door opening in one side thereof, and hooks arranged at opposite sides of the door opening, a mat including a substantially rectangular frame, and a plurality of longitudinally and transversely disposed coiled elements interconnected to remove the straw from the chickens' feet as they leave the coop, and eyes projecting from the opposed sides of the frame to receive said hooks whereby said mat is supported at an inclination to the ground.

In testimony whereof I affix my signature.

WILLIAM W. KARRO.